Dec. 25, 1928.
F. G. BREMER
AUTOMOBILE BUMPER
Filed Feb. 18, 1928
1,696,187
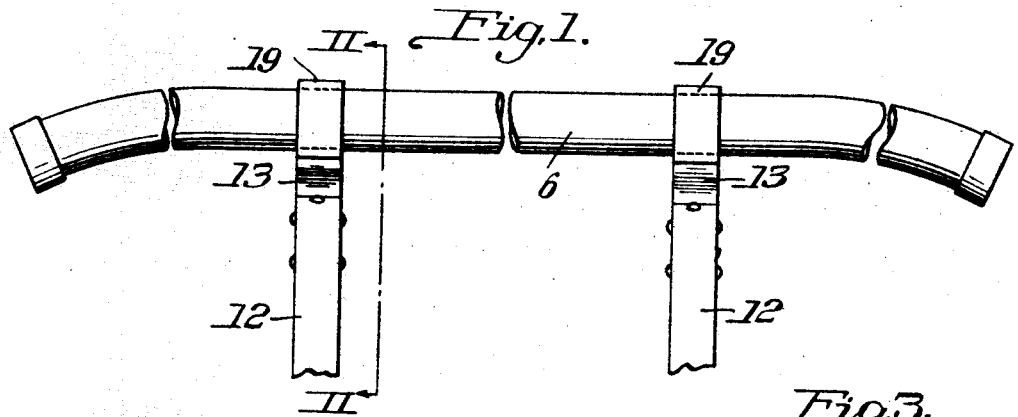
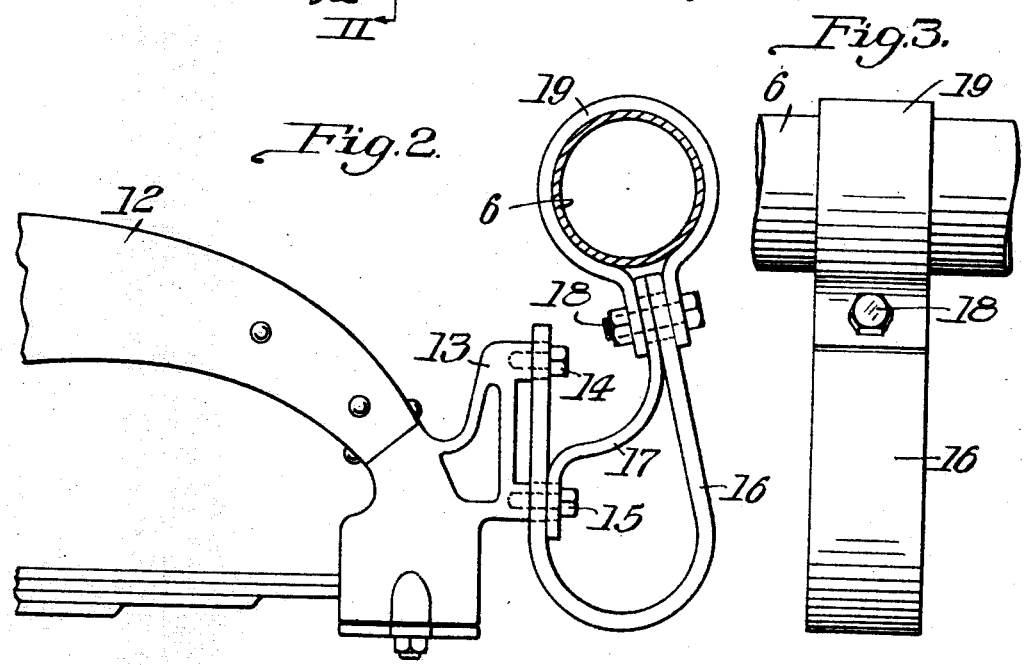
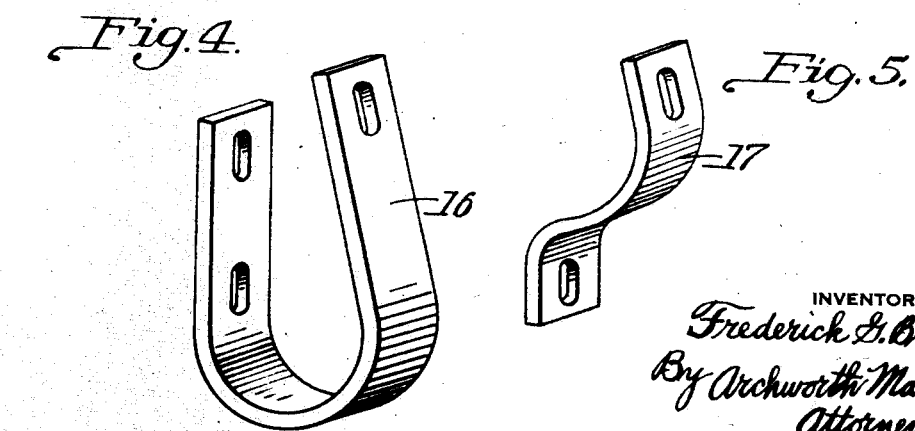
INVENTOR
Frederick G. Bremer
By Archworth Martin,
Attorney.

Patented Dec. 25, 1928.

1,696,187

UNITED STATES PATENT OFFICE.

FREDERICK G. BREMER, OF PITTSBURGH, PENNSYLVANIA, ASSIGNOR TO UNITED STATES CHAIN & FORGING COMPANY, OF PITTSBURGH, PENNSYLVANIA, A CORPORATION OF DELAWARE.

AUTOMOBILE BUMPER.

Application filed February 18, 1928. Serial No. 255,227.

My invention relates to automobile bumper structures such as are employed at the front and rear ends of motor vehicles, for absorbing the force of impacts.

One object of my invention is to provide an improved manner of yieldably supporting the impact-receiving bars.

Another object of my invention is to provide means for effecting vertical adjustments of bumper bars with respect to the vehicle frames to which they are attached.

A further object of my invention is to provide an improved form of buffer springs for supporting automobile bumpers.

Still another object is to provide an improved means for connecting buffer springs to bumper bars and vehicle frames.

One form which my invention may take is shown in the accompanying drawing, wherein Fig. 1 is a fragmentary plan view of a bumper structure mounted upon the forward portion of a vehicle frame; Fig. 2 is a view on an enlarged scale, taken on the line II—II of Fig. 1; Fig. 3 is a front elevational view of the structure of Fig. 2; Fig. 4 is a perspective view showing one of the buffer springs of Fig. 3, and Fig. 5 is a perspective view showing the other buffer spring.

My invention comprises a modification of the structure shown in my co-pending application, Serial Number 238,059, filed December 6, 1927.

In Fig. 1, I have shown an impact-receiving bar 6 of circular form in cross section and which is connected to the forward ends of vehicle frame members 12. The frame members 12 carry bracket-like extensions 13 that are secured thereto in any suitable manner or which may be formed integrally therewith. The brackets 13 each have internally-threaded bosses for the reception of screws 14 and 15. A pair of buffer springs 16 and 17 is secured to each of the brackets 13, the spring 16 being provided with elongated slots through which the screws 14 and 15 may extend to secure it to the frame. The slots are elongated in order to permit of vertical adjustment so that the bar 6 which is carried at the outer ends of the buffer springs can be positioned at a desired height with respect to the wheels or other portion of the vehicle. The buffer spring 17 is provided with a slot at its lower end through which the screw 15 may pass to secure it in adjusted position. The outer ends of each pair of springs 16 and 17 are slotted and held in assembled relation by a clamping bolt 18 which passes through the ends of a collar 19, the collars 19 being thereby clamped about the bar 6 to hold it firmly in position with respect to the buffer springs. The slotted holes in the outer ends of the springs 16 and 17 permit of vertical adjustment of the bar with respect to such springs.

There is, therefore, vertical adjustment provided at both the inner and the outer ends of the buffer springs, so that the slots at either the inner ends or the outer ends of the springs need not be made excessively long in order to secure a proper range of vertical adjustment. It will also be seen that the spring 17 is vertically adjustable independently of the spring 16, so that the bracing or reinforcing effect produced thereby may be varied, depending upon the height to which the spring 17 is adjusted with respect to the spring 16. Thus if the spring 17 is adjusted to a lower position with respect to the spring 16 than that shown in Fig. 2, the bracing effect will not be the same as if it were set at a higher position.

The spring 17 resists downward thrusts on the impact bar 6 to a greater extent than does the spring 16, by reason of the more shallow curvature and shorter length of the spring 17. The spring 17 also braces the spring 16 against rearward deflection, and by reason of the fact that it is connected to the vehicle frame only by the lower screw 15, it may have greater length and hence more yielding quality than if it were secured by the screw 14. Furthermore, the arrangement of the spring 17 provides for a pivot-like effect when blows are imposed against the forward side of the bar 6, since such spring functions somewhat as a pivot about which deflections of the spring 16 occur.

I claim as my invention:—

1. Buffer spring structure comprising a yieldable member of yoke-like form, means for securing the inner end of said member to a vehicle frame, and means for connecting the outer end of said member to an impact bar, one of said securing means being adjustable in a direction longitudinally of said member.

2. Buffer spring structure comprising a yieldable member of yoke-like form, means for securing the inner end of said member to a vehicle frame, and means for connecting the outer end of said member to an impact bar, each of said securing means being adjustable in a direction longitudinally of said member.

3. Buffer spring structure comprising a yieldable member, means for securing the inner end of said member to a vehicle frame, means for securing the other end of said member to an impact bar, and a yieldable reinforcing member having one extremity adjustably connected to the outer end of the first-named member and its other extremity adjustably connected to said member at a point adjacent to its inner end.

4. Buffer spring structure comprising a yieldable member of strap-like material, means for connecting the inner end portion of said member to a vehicle frame at a plurality of vertically-spaced points, means for connecting the outer end of said member to an impact bar, a yieldable reinforcing member of strap-like material, means for connecting the inner end of said member to the lowermost of the said plurality of connections and means for connecting the outer end thereof to an outer portion of the first-named member.

5. Buffer spring structure comprising a yieldable member of strap-like form, a yieldable reinforcing member having its ends connected to inner and outer portions of the said member, means for connecting one of said members to a vehicle frame, means for connecting said members to an impact bar, and means for effecting vertical adjustment of said members as a unit.

6. Buffer spring structure comprising a yieldable member of strap-like form, a yieldable reinforcing member having its ends connected to inner and outer portions of the said member, means for connecting one of said members to a vehicle frame, means for connecting said members to an impact bar, and means for effecting vertical adjustments of said members independently of one another.

7. Buffer spring structure comprising a yieldable member of strap-like form having slots adjacent to its inner and outer ends, and a bolt extending through each slot for effecting adjustable connection of said strap ends to a vehicle frame and an impact bar respectively.

8. Buffer spring structure comprising a yieldable member of strap-like form having a slotted opening adjacent to one end thereof, and means for connecting the ends of said member to a vehicle frame and an impact bar respectively, one of said means including a bolt which extends through said slot for the purpose of effecting vertical adjustment of the said member.

In testimony whereof I, the said FREDERICK G. BREMER, have hereunto set my hand.

FREDERICK G. BREMER.